United States Patent
Jiao et al.

(10) Patent No.: US 11,789,940 B2
(45) Date of Patent: Oct. 17, 2023

(54) NATURAL LANGUAGE INTERFACE TO DATABASES

(71) Applicant: American Express Travel Related Services Company, Inc., New York, NY (US)

(72) Inventors: Yue Jiao, New York, NY (US); Salil Joshi, Bangalore (IN); Shourya Roy, Bangalore (IN); Dawn Thomas, New York, NY (US); Bharath Venkatesh, Bangalore (IN)

(73) Assignee: American Express Travel Related Services Company, Inc., New York, NY (US)

( * ) Notice: Subject to any disclaimer, the term of this patent is extended or adjusted under 35 U.S.C. 154(b) by 421 days.

(21) Appl. No.: 16/588,155

(22) Filed: Sep. 30, 2019

(65) Prior Publication Data

US 2021/0049158 A1    Feb. 18, 2021

(30) Foreign Application Priority Data

Aug. 16, 2019  (IN) .............................. 201911033066

(51) Int. Cl.
*G06F 16/242* (2019.01)
*G06N 20/00* (2019.01)
*G06F 16/2455* (2019.01)

(52) U.S. Cl.
CPC ...... *G06F 16/243* (2019.01); *G06F 16/24565* (2019.01); *G06N 20/00* (2019.01)

(58) Field of Classification Search
CPC .. G06F 16/243; G06F 16/24565; G06N 20/00
See application file for complete search history.

(56) References Cited

U.S. PATENT DOCUMENTS

| | | | |
|---|---|---|---|
| 2017/0083569 A1* | 3/2017 | Boguraev | G06F 16/243 |
| 2019/0243831 A1* | 8/2019 | Rumiantsau | G10L 15/26 |
| 2019/0272296 A1* | 9/2019 | Prakash | G06F 16/90335 |
| 2020/0034362 A1* | 1/2020 | Galitsky | G06F 16/24522 |

OTHER PUBLICATIONS

Utama, Prasetya, et al. "An end-to-end neural natural language interface for databases." arXiv preprint arXiv:1804.00401 (2018). (Year: 2018).*

* cited by examiner

*Primary Examiner* — Mark D Featherstone
*Assistant Examiner* — Samuel C Sharpless, III
(74) *Attorney, Agent, or Firm* — Thomas Horstemeyer, LLP

(57) ABSTRACT

Disclosed are various approaches for providing a natural language interface for searching databases. A natural language query is parsed to identify a plurality of tokens. At least one operator is identified with a machine-learning model based at least in part on the plurality of tokens. Next, at least one attribute and at least one respective attribute value are identified with a machine-learning model based at least in part on the plurality of tokens. Then, at least one constraint is identified with a machine-learning model based at least in part on the plurality of tokens. Finally, a machine language query is generated based at least in part on the at least one operator, the constraint(s), the attribute(s), and the respective attribute value(s).

20 Claims, 5 Drawing Sheets

NATURAL LANGUAGE INTERFACE TO DATABASES

CROSS-REFERENCE TO RELATED APPLICATIONS

This application claims priority to, and the benefit of, Indian Provisional Patent Application No. 201911033066, entitled "Natural Language Interface to Databases," and filed on Aug. 16, 2019, which is incorporated by reference as if set forth herein in its entirety.

BACKGROUND

Individuals often desire to retrieve information stored in databases in order to analyze data and reach an appropriate decision. Typically, data in a database can be accessed using a database query language, such as a version of the Structured Query Language (SQL). To effectively use SQL to retrieve information, however, one often needs both a working knowledge of the SQL language and a knowledge of the database schema, including table, row, and column names. However, many individuals who may wish to retrieve data may not be trained programmers, much less have the knowledge to write SQL queries. Moreover, database schemas are often not well-known to those who are not database administrators or programmers. For example, business analysts may know the type of data they wish to retrieve, but not which rows or tables this data is stored in or be able to decipher potentially cryptic table, row, or column names to identify where the desired data is located.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for providing an interface to users that supports natural language database queries. Users can input in the user interface a natural language query to retrieve information stored in a database. Using various machine learning and natural language processing techniques, the natural language query can be converted into a Structured Query Language (SQL) query for the database. The SQL query can then be executed and the results returned to the user. For example, the results may be returned in a file or displayed within a user interface rendered by the client device of the user. In the following discussion, a general description of the system and its components is provided, followed by a discussion of the operation of the same.

Figure 1:
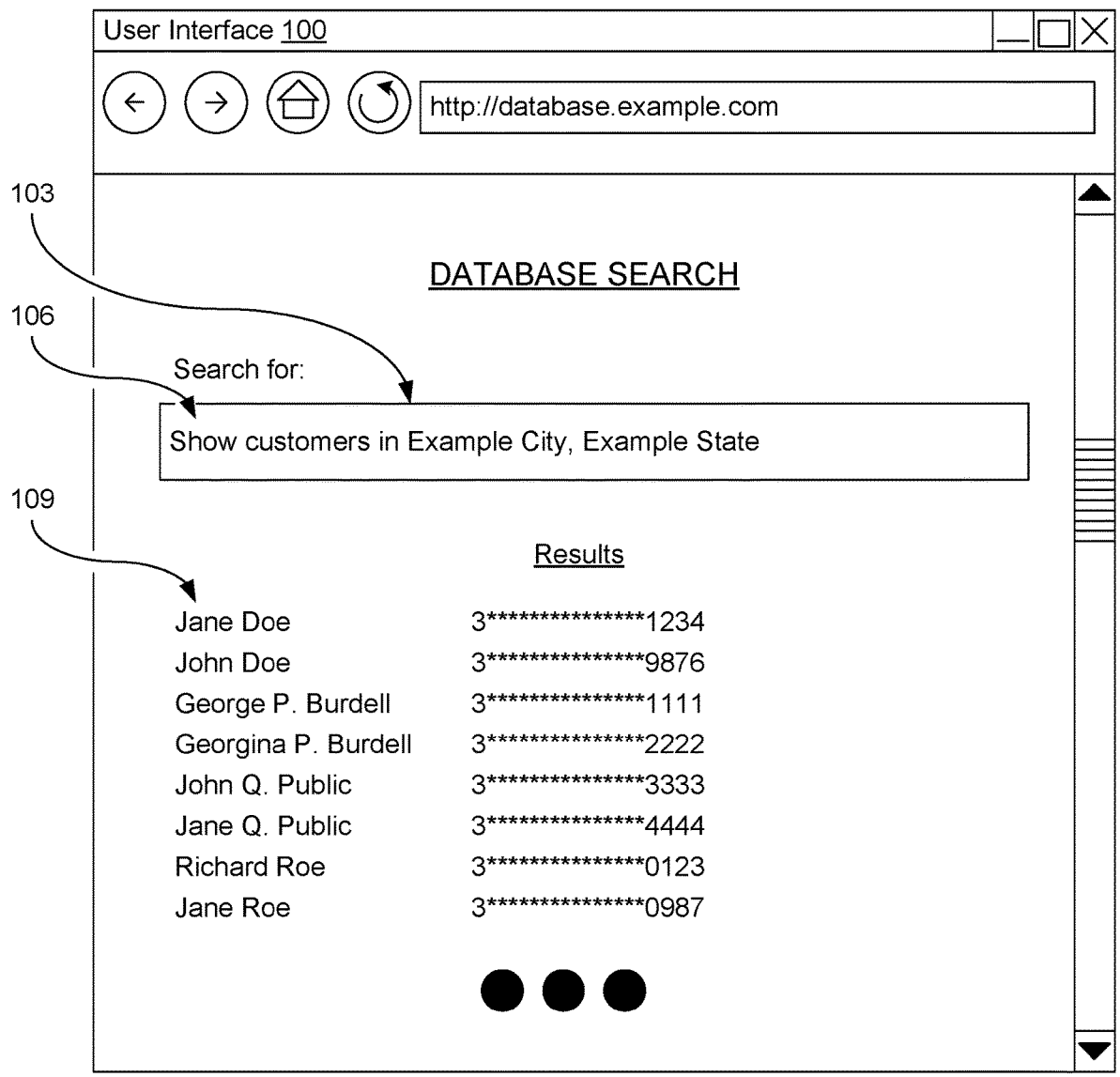
FIG. 1 is a drawing depicting an example user interface rendered by a client in one of several embodiments of the present disclosure.

FIG. 1 depicts an example of a user interface 100 according to various embodiments of the present disclosure. The user interface 100 can be embodied, for example, as a web page within a browser window or window for a dedicated or stand-alone application. The user interface 100 can provide, for example, an input element 103 that allows a user to provide a natural language search query 106. In response to submission of the natural language search query, the user interface can also display one or more results 109 for the natural language search query 106.

Figure 2:
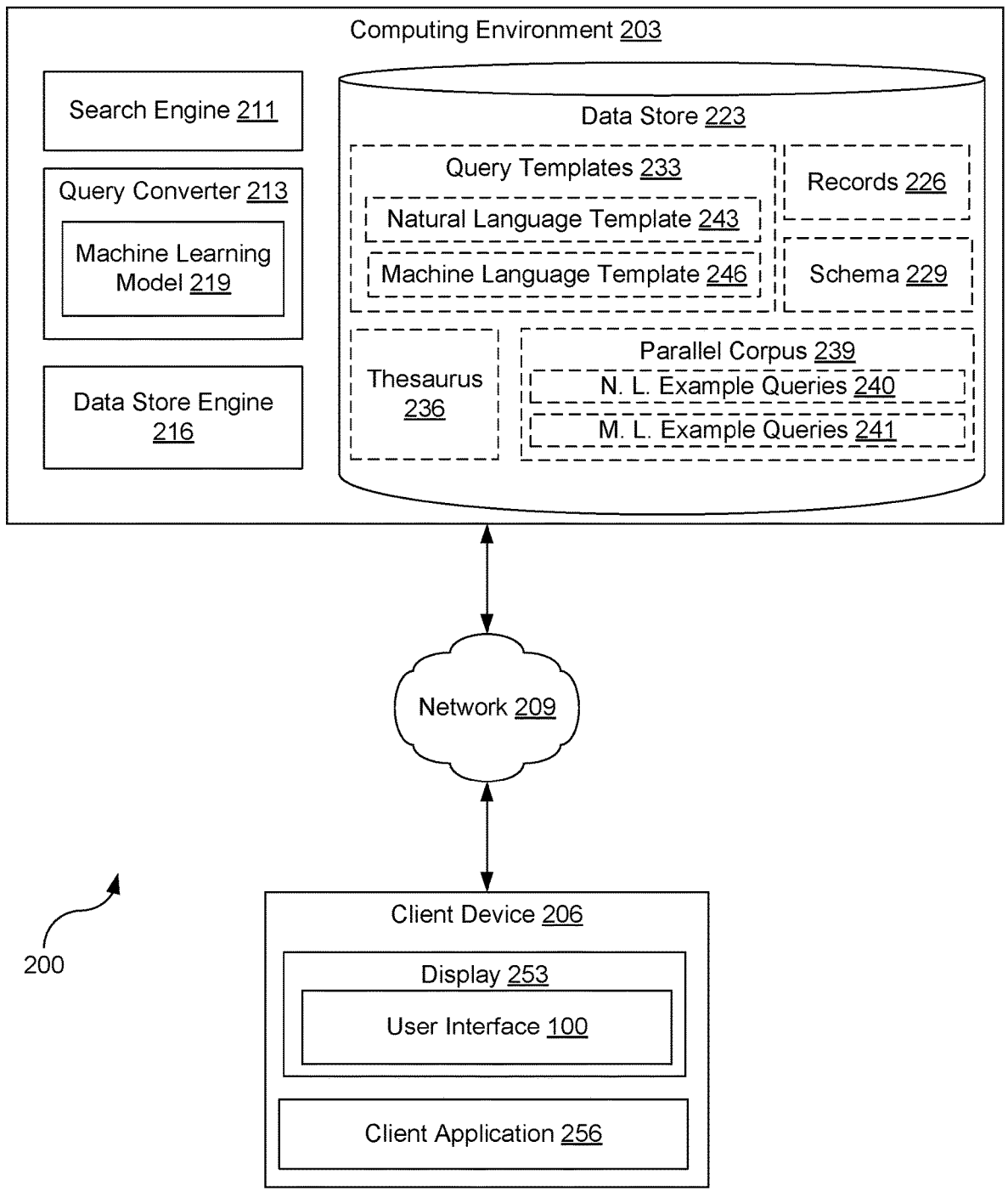
FIG. 2 is a drawing of a network environment according to various embodiments of the present disclosure.

With reference to FIG. 2, shown is a network environment 200 according to various embodiments. The network environment 200 includes a computing environment 203 and a client device 206, which are in data communication with each other via a network 209. The network 209 includes wide area networks (WANs) and local area networks (LANs). These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., BLUETOOTH® networks, microwave transmission networks, as well as other networks relying on radio broadcasts. The network 209 can also include a combination of two or more networks 209. Examples of networks 209 can include the Internet, intranets, extranets, virtual private networks (VPNs), and similar networks.

The computing environment 203 can include a server computer or any other system providing computing capability. Alternatively, the computing environment 203 can employ a plurality of computing devices that can be arranged in one or more server banks or computer banks or other arrangements. Such computing devices can be located in a single installation or can be distributed among many different geographical locations. For example, the computing environment 203 can include a plurality of computing devices that together can include a hosted computing resource, a grid computing resource or any other distributed computing arrangement. In some cases, the computing environment 203 can correspond to an elastic computing resource where the allotted capacity of processing, network, storage, or other computing-related resources can vary over time.

Various applications or other functionality can be executed in the computing environment 203 according to various embodiments. The components executed on the computing environment 203 include a search engine 211, a query converter 213, a data store engine 216, and other applications, services, processes, systems, engines, or functionality not discussed in detail herein.

The search engine 211 can be used to generate and provide a user interface 100 to the client device 206, receive input or instructions from the client device 206, and interact with the query converter 213 on behalf of the client device 206. For example, the search engine 211 can generate a web page and provide it to the client device 206 to display in response to a request from the client device 206. Input or commands, such as a natural language search query 106, can be received and processed by the search engine 211 and provided to the query converter 213. Likewise, results 109 for the natural language search query 106 can be received from either the query converter 213 or the data store engine 216 by the search engine 211 and embedded in a user interface 100 (e.g., a web page) presented to the client device 206. Accordingly, the search engine 211 could include a web server configured to serve web pages or host a web-based application. In this context, the search engine 211 can be considered to display the user interface 100 by sending the user interface 100 (e.g., a web page) to the client device 206.

The query converter 213 can be executed to receive natural language search queries and convert or translate them into machine language queries. Examples of machine language queries include structured query language (SQL) queries and various non-relational database queries. Accordingly, the query converter 213 can use a machine learning model 219 to perform a machine translation of the natural language query into the SQL query.

The machine learning model 219 can represent any machine learning approach suitable for translating a natural language query into a machine language query. Examples of appropriate machine learning models 219 include conditional random fields, neural networks, or similar approaches. The machine learning model 219 can be trained to perform a translation using approaches described later.

The data store engine 216 is executed to receive machine language queries, evaluate the machine language query, and return data from the data store 223. For example, the data store engine 216 could be a relational database engine (e.g., a SQL database) that evaluates a SQL query and returns all rows in the data store 223 that match the SQL query.

Various data is stored in the data store 223 that is accessible to the computing environment 203. The data store 223 can be representative of a plurality of data stores 223, which can include relational databases, object-oriented databases, hierarchical databases, hash tables or similar key-value data stores, as well as other data storage applications or data structures. The data stored in the data store 223 is associated with the operation of the various applications or functional entities described below. This data can include records 226, a schema 229, query templates 233, a thesaurus 236, a parallel corpus 239 for training the machine learning model 219, and potentially other data.

The records 226 represent data stored in the data store 223 that can be queried and retrieved by the data store engine 216. For example, one or more records 226 may be retrieved by the data store engine 216 in response to receipt of a machine language query translated from a natural language query by the query converter 213. Records 226 can be stored in one or more tables, each table containing one or more rows and one or more columns.

The schema 229 represents metadata about the records 226 stored in the data store 223. For example, the schema 229 could include names and descriptions of each table or column used to store individual records 226. As an example, the schema 229 could include a list of column identifiers in a table of records 226, the type of data stored in a column (e.g., text, integer, floating point, currency, time or date, etc.) and a description of the data stored in the column (e.g., "customer name," "transaction time," "transaction amount," "current balance," "account number," "street address," etc.) as well as a column name. An example of a database schema 229 is set forth below in Table 1:

TABLE 1

| Column Name | Description | Type |
| --- | --- | --- |
| Card_Spend_USD | Money Spent in USD | Numeric/Currency |
| Cust_Name | Customer Name | Character String |
| Acct_Number | Account Number | Numeric |
| State | State | Character String |
| Trans_ID | Transaction Identifier | Alphanumeric |
| Trans_Time | Time of Transaction | Numeric/String |
| Trans_Amt | Amount of Transaction | Numeric/Currentcy |

Individual query templates 233 can be used to generate a parallel corpus 239 of training data for use in training the machine learning model 219 to translate natural language queries into machine language queries. Accordingly, each query template 233 can include a natural language template 243 and a machine language template 246 that can be used to generate a machine language query that corresponds to a natural language query. A query template 233 can represent a complete query or portions of a query. Each natural language template 243 or machine language template 246 can include or specify arguments that may be expected and where they may be expected to appear. Examples of several pairs of natural language templates 243 and machine language templates 246 are set forth below in Table 2:

TABLE 2

| Natural Language Template 243 | Machine Language Template 246 |
| --- | --- |
| How many @ARGS across @Group | SELECT @GROUP COUNT (distinct @ARGS) |
| How many @ARGS break down by @GROUP | SELECT @GROUP COUNT (distinct @ARGS) |
| How much total @ARGS | SELECT sum (@ARGS) |
| How much total @ARGS break down by @GROUP | SELECT @GROUP sum (@ARGS) |
| Current @ARGS | SELECT MAX (@ARGS) |
| Early (@ARGS) | SELECT MIN@ARGS) |
| Return @ARGS | SELECT @ARGS |
| Show @ARGS | SELECT @ARGS |
| List @ARGS | SELECT @ARGS |
| How many @ARGS | SELECT COUNT (distinct @ARGS) |
| Most recent @ARGS | SELECT MAX (@ARGS) |

TABLE 2-continued

| Natural Language Template 243 | Machine Language Template 246 |
| --- | --- |
| After @ARGS | WHERE @CONSTRAINT > @ARGS |
| At least @ARGS | WHERE @CONSTRAINT >= @ARGS |
| Before @ARGS | WHERE @CONSTRAINT < @ARGS |
| At Most @ARGS | WHERE @CONSTRAINT <= @ARGS |

Query templates 233 may be specific to a particular implementation because each database may have a different schema 229. Accordingly, in some implementations, query templates 233 can be manually generated prior to training. However, query templates 233 can also be generated automatically using the data contained in the schema 229.

The thesaurus 236 can represent a list of synonyms or paraphrases for common terms, including arguments or constraints for a particular query. For example, the thesaurus 236 might include a list of words or phrases that are synonymous with a SELECT query in SQL, such as "list," "show," "demonstrate," "indicate," "return," etc. Likewise, the thesaurus 236 can also include synonyms for various conditions or constraints, such as the terms "after" and "greater" being an indication of the "greater than" operator (>).

The parallel corpus 239 can represent a collection of natural language example queries 240 and respective machine language example queries 241 that map to the natural language example queries 240, which can be used to train the machine learning model 219 used by the query converter 213 to translate a natural language search query 106 into a machine language search query. As a simple example, the parallel corpus 239 could include a first natural language example query 240 "return all active account holders" which maps to a first machine language example query 241 of "SELECT*FROM CUSTOMERS WHERE Status='ACTIVE'". To build on the example, the parallel corpus 239 could also include a second natural example language query 240 "show all account holders" which maps to the first machine language query 241 of "SELECT*FROM CUSTOMERS WHERE Status='ACTIVE'".

Additional natural language example queries 240 and machine language example queries 241 can also be included in the parallel corpus 239, as well as the relationships between them. As each database to be queried has different types of records 226 and a different schema 229, a unique parallel corpus 239 may be used for each specific implementation. To ensure a sufficient number of relevant natural language example queries 240 and machine language example queries 241, the parallel corpus 239 can be generated automatically and/or programmatically, as discussed below.

The client device 206 is representative of a plurality of client devices that can be coupled to the network 209. The client device 206 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), media playback devices (e.g., media streaming devices, BluRay® players, digital video disc (DVD) players, set-top boxes, and similar devices), a videogame console, or other devices with like capability. The client device 206 can include one or more displays 253, such as liquid crystal displays (LCDs), gas plasma-based flat panel displays, organic light emitting diode (OLED) displays, electrophoretic ink ("E-ink") displays, projectors, or other types of display devices. In some instances, the display 253 can be a component of the client device 206 or can be connected to the client device 206 through a wired or wireless connection.

The client device 206 can be configured to execute various applications such as a client application 256 or other applications. The client application 256 can be executed in a client device 206 to access network content served up by the computing environment 203 or other servers, thereby rendering a user interface 100 on the display 253. To this end, the client application 256 can include a browser, a dedicated application, or other executable and the user interface 100 can include a network page, an application screen, or another user mechanism for obtaining user input. The client device 206 can be configured to execute applications beyond the client application 256 such as email applications, social networking applications, word processors, spreadsheets, or other applications.

Next, a general description of the operation of the various components of the network environment 200 is provided. Although the following description provides an illustrative example of how the components of the network environment 200 can interact with each other, a more detailed description of the operation of the individual components is provided in the discussion of the subsequent figures.

To begin, an appropriate parallel corpus 239 of natural language example queries 240 and machine language example queries 241 can be generated. For example, the query converter 213 can analyze the schema 229 for the records 226 to identify individual attributes and constraints on a search. For instance, the query converter 213 might use the description of a column in table to identify a natural language description of the data represented by the column. The query converter 213 could also identify the type of data stored in a column (e.g., integers, floating point, currency, character strings, timestamps, etc.). The query converter 213 could use these pieces of data to identify which attributes of individual records 226 could be used as a key for a natural language search query 106 and which constraints could be placed on the natural language search query 106. These attributes and constraints could be inserted as arguments into natural language template 243 or machine language template 246 to generate respective natural language example queries 240 or machine language example queries 241. The thesaurus 236 could also be used to generate additional natural language example queries 240 mapped to a particular machine language example query 241 using synonyms for the identified attributes or constraints or for particular machine language query operators in a machine language template 246.

The newly generated natural language example queries 240 and machine language example queries 241 could then be added to the parallel corpus 239, along with information indicating the mapping between the individual natural language example queries 240 and the machine language example queries 241. Then, the machine learning model 219 is trained with the parallel corpus 239 to translate, map, or otherwise convert a natural language search query 106 into a machine language search query.

Subsequently, the search engine 211 receives a natural language search query 106 from the client device 206. The natural language search query 106 could take any one of several forms. For example, the natural language search query 106 could be represented as a text string provided by the client application 256 (e.g., as a character string entered into a web page generated by the search engine 211 and rendered by a browser). As another example, the natural language search query 106 could be in the form of audio data (e.g., as a command spoken into a microphone). The search engine 211 can then pass the natural language search query 106 to the query converter 213.

The query converter 213 can then convert the natural language search query 106 to a machine language search query. In implementations where the natural language search query 106 is represented by audio data, the query converter 213 could first use a speech-to-text conversion to convert the audio into a character string that represents the natural language search query 106. The query converter 213 can then use the trained machine learning model 219 to convert the natural language search query 106 into a machine language search query.

The machine language search query can then be passed on to the data store engine 216, which executes the machine language search query. For instance, the data store engine 216 can evaluate the machine language search query, identify which records 226 match the machine language search query, and return those records 226 to the search engine 211 or the query converter 213, depending upon the details of the particular implementation. The selected records 226 could then be returned to the client application 256 for display in the user interface 100 as search results 109.

Figure 3:
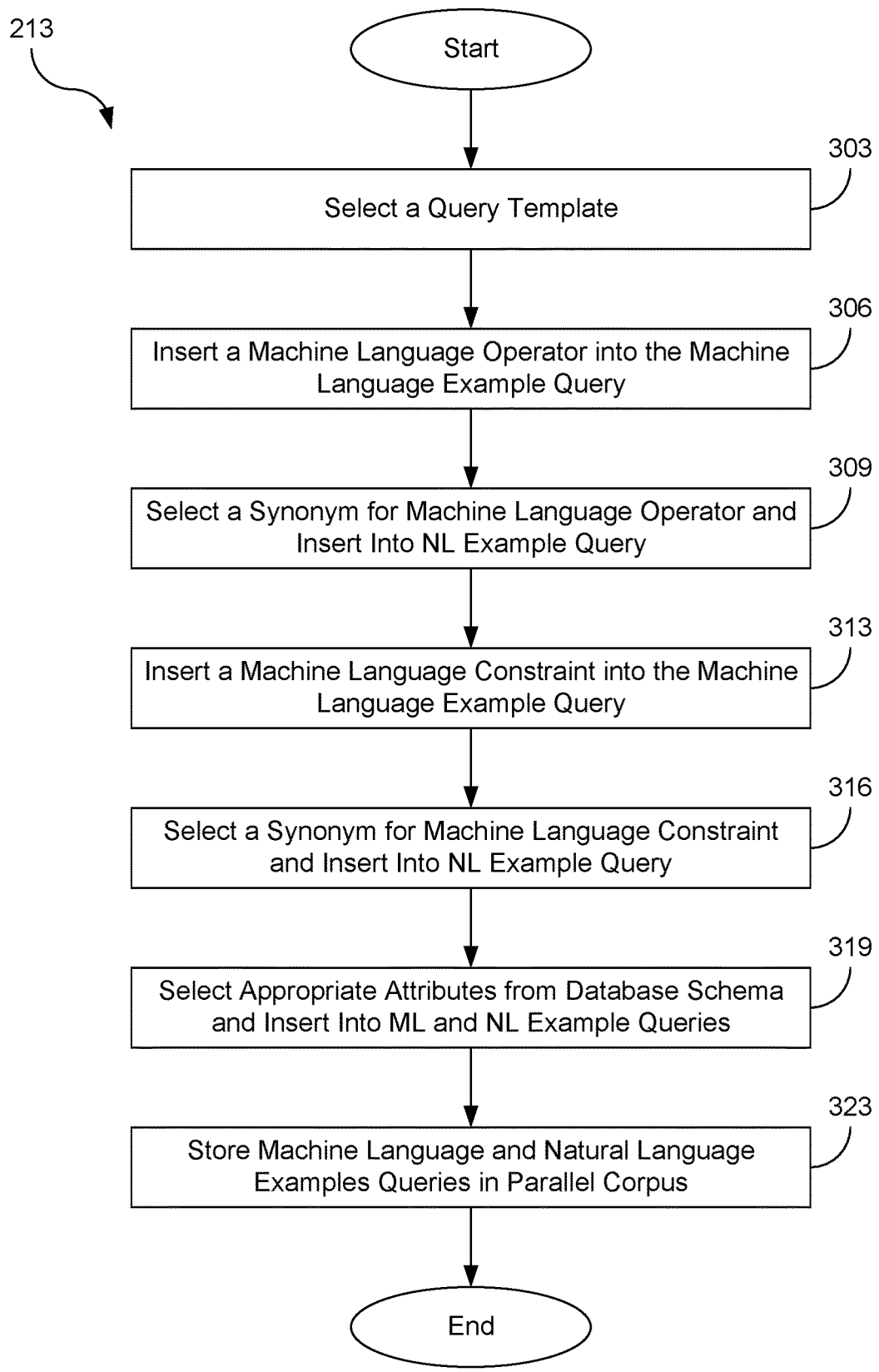
FIG. 3 is a flowchart illustrating one example of functionality implemented as portions of an application executed in a computing environment in the network environment of FIG. 2 according to various embodiments of the present disclosure.

Referring next to FIG. 3, shown is a flowchart that provides one example of the operation of a portion of the query converter 213 for generating the parallel corpus 239 to train the machine learning model 219. It is understood that the flowchart of FIG. 3 provides merely an example of the many different types of functional arrangements that can be employed to implement the operation of the depicted portion of the query converter 213. As an alternative, the flowchart of FIG. 3 can be viewed as depicting an example of elements of a method implemented within the network environment 200.

Beginning with step 303, the query converter 213 selects a query template 233 for the basis of a new entry in the parallel corpus 239. The query template 233 can be selected based on various criteria. For example, a query template 233 may be selected if it has not yet been used for adding data to the parallel corpus 239. As another example, a query template 233 may be selected if an insufficient number of samples in the parallel corpus 239 based off of the query template are present in the parallel corpus 239.

Then at step 306, the query converter 213 can insert a machine language operator into a machine language example query 241 based on the machine language template 246. The machine language operator can be any portion of a machine language search query that provides programmatic instructions to a data store engine 216 regarding how to select records 226 or which records 226 to select. In an example machine language search query that is written using SQL, such as "SELECT @ARGS FROM @TABLE WHERE @CONSTRAINT," the "SELECT" instruction is an operator that causes the data store engine 216 to retrieve records 226 instead of updating, inserting, or deleting records. Likewise, the "WHERE" instruction is an operator that causes the data store engine 216 to limit the retrieval of records 226 to those individual records 226 that comply with one or more specified constraints.

Next at step 309, the query converter 213 can select a synonym for the operator from the thesaurus 236 and insert it in the respective natural language example query 240 constructed from the natural language template 243 in the query template 233. For example, a natural language synonym for the "SELECT" operator might be "list," "show," "display," "provide," or "return." Accordingly, the query converter 213 could include the word "list" in an appropriate location specified by the natural language template 243 for a natural language example query 240 constructed using the natural language template 243. Where multiple synonyms are available, the query converter 213 can perform the process multiple times in order to generate separate natural language example queries 240 based at least in part on each synonym.

Proceeding to step 313, the query converter 213 can insert one or more machine language constraints into the machine language example query 241 based on the machine language template 246. The constraints may be based at least in part on the schema 229 for the records 226 in the data store 223. For example, the schema 229 may specify a column name in a table, a description of the column name, and the type of data stored in the column. Using the schema 229, the query converter 213 could generate a valid constraint for selecting records 226. For instance, if the schema 229 specified that a column name was "acct_bal" with a description of "Account Balance" and stored numeric data (e.g., a currency), then the query converter 213 could generate a machine language constraint such as "WHERE acct_bal>0." Such a constraint could then be inserted into the machine language example query 241 being constructed from the machine language template 246.

Then at step 316, the query converter 213 could similarly select a synonym for the constraint and insert the synonyms into the respective natural language example query 240 being constructed. For example, synonyms of "WHERE" clauses in SQL queries could include English language prepositions such as "in," "has," "have," or "with." Likewise, operators such greater than (">"), less than ("<"), etc. could also have synonyms such as "at least," "more than," "no greater than," "maximum," "minimum," etc. Likewise, the query converter 213 could use descriptions of column names in the database schema 229 or synonyms for the descriptions to generate a natural language version of the constraint. In the example constraint from step 313, "WHERE acct_bal>," the query converter 213 could select the synonym "with" for the constraint-operator "WHERE" and "account balance" for "acct_bal" to generate the natural language constraint "with an account balance," "with an account balance greater than," or "with an account balance more than." The synonymous constraint could then be inserted into the natural language example query 240 according to the natural language template 243.

Next at step 319, the query converter 213 can select the appropriate attributes to insert as arguments in the natural language example query 240 and machine language example query 241. Each attribute may serve as a variable or argument for an operator or a constraint. For example, in the constraint "WHERE acct_bal>," the query converter 213 could identify a random number to serve as an argument for the account balance constraint. For example, if a number of "$500" were selected for the account balance, the resulting machine language constraint would be "WHERE acct_bal>500" and the resulting natural language constraint could be "with an account balance greater than $500" or "with an account balance more than $500." In another example, a machine language example query 241 could include a "SELECT" operator and the arguments could be one or more column names. For example, the query converter 213 could select one or more columns at random to place after the "SELECT" operator in a machine language example query 241 and insert the column descriptions from the database schema 229 or synonyms of the descriptions in natural language example query 240 according to the respective machine language template 246 and natural language template 243, resulting in a complete natural language example query 240 and machine language example query 241 mapped together.

Then at step 323, the query converter 213 can store the machine language example query 241 and natural language example query 240 in the parallel corpus 239. However, in some embodiments, the machine language example query 241 and natural language example query 240 can be provided to the machine learning model 219 for training as soon as or shortly after they are generated by the query converter 213. The process then ends, although multiple iterations of the method depicted in FIG. 3 could be performed to generate a parallel corpus 239 of sufficient size for training the machine learning model 219. Once the parallel corpus 239 has been generated, it can be used to train the machine learning model 219.

Figure 4:
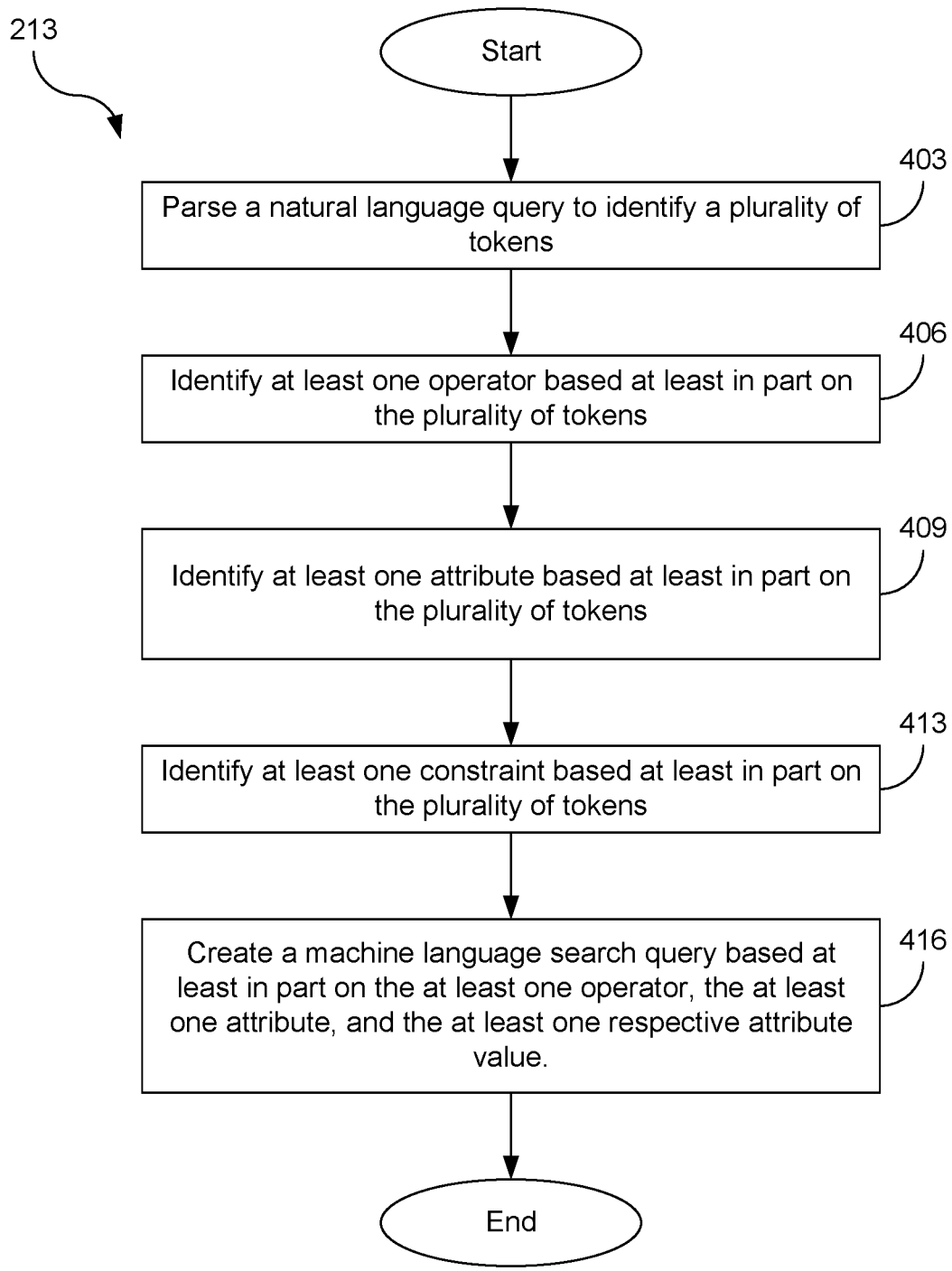
FIG. 4 is a flowchart illustrating one example of functionality implemented as portions of an application executed in a computing environment in the network environment of FIG. 2 according to various embodiments of the present disclosure.

Referring next to FIG. 4, shown is a flowchart that provides one example of the operation of a portion of the query converter 213. It is understood that the flowchart of FIG. 4 provides merely an example of the many different types of functional arrangements that can be employed to implement the operation of the depicted portion of the query converter 213. As an alternative, the flowchart of FIG. 4 can be viewed as depicting an example of elements of a method implemented within the network environment 200.

Beginning with step 403, a natural language search query 106 is received by the query converter 213 and parsed to identify a plurality of tokens. A token can include a single word or a series of consecutive words that forms a semantically meaningful phrase. Individual words can include any alphanumeric sequence of characters. For example, a token in a natural language search query 106 could include the word "show" or "return" which could indicate a desire to execute a machine language search query that uses the "SELECT" operator. Likewise, prepositional phrases could indicate constraints on a search query. For example, the natural language search query 106 "show all customers in California" contains the prepositional phrase "in California," which could indicate a desire by the user to include a "WHERE" clause in a SQL query for selecting individual records 226 of customers that live in California. Accordingly, the tokens can be identified and, in some instances, assembled into logical grouping or phrases based on grammar rules in order to facilitate further processing.

In some implementations, the query converter 213 can do some preprocessing of the natural language search query 106 prior to parsing. For instance, if the natural language search query 106 is in the form of audio data (e.g., because it was spoken into a microphone), the query converter 213 could perform a speech-to-text conversion of the audio file to generate a character string that can be parsed to identify the plurality of tokens.

Then at step 406, the query converter 213 can identify at least one operator for a machine language search query based at least in part on the plurality of tokens. For instance, the query converter 213 could use the trained machine learning model 219 to identify which tokens (e.g., words or phrases) are most likely to indicate, represent, or map to an operator. As a simple example, the machinelearning model 219 could identify one or more tokens (e.g., words or phrases) as being similar to or synonymous with another token or set of tokens that are known to represent a particular operator. For instance, the machine learning model 219 could determine that any natural language search queries 106 that begin with interrogatories such as "how many" or "what is the number" represent the SQL operator "SELECT COUNT" while natural language search queries 106 that begin with verbs represent the SQL operator "SELECT." However, other inferences or decisions could be made about the tokens identified at step 403 to determine which operator is intended by the natural language search query 106, depending on the particular machine learning model 219 used.

Next at step 409, the query converter 213 can identify at least one attribute and at least one attribute value for a machine language search query based at least in part on the plurality of tokens. For instance, the query converter 213 could use the trained machine learning model 219 to identify which tokens (e.g., words or phrases) are most likely to indicate, represent, map to, or include an attribute. As a simple example, the machine learning model 219 could identify one or more tokens (e.g., words or phrases) as being similar to or synonymous with another token or set of tokens that are known to represent a particular column in a table of records 226. For example, the machine learning model 219 could determine that the tokens forming the phrase "show all account numbers" represents the column name "acct_num" in the customer table. However, other inferences or decisions could be made about the tokens identified at step 403 to determine which attribute is intended by the natural language search query 106, depending on the particular machine learning model 219 used.

Proceeding to step 413, the query converter 213 can identify at least one constraint for the machine language search query based at least in part on the plurality of tokens. For instance, the query converter 213 could use the trained machine learning model 219 to identify which tokens (e.g., words or phrases) are most likely to indicate, represent, or map to a constraint, including the value for the constraint. As a simple example, the machine learning model 219 could identify one or more tokens (e.g., words or phrases) as being similar to or synonymous with another token or set of tokens that are known to represent a column name in a table of records 226, as well as a valid value for data stored in the column. For instance, the machine learning model 219 could determine that the tokens that form the phrase "living in California" represents a constraint "WHERE location='CA'" in a SQL query. However, other inferences or decisions could be made about the tokens identified at step 403 to determine which operator is intended by the natural language search query 106, depending on the particular machine learning model 219 used.

Then at step 416, the query converter 213 can generate the machine language search query using the operator(s), attribute(s), attribute value(s), and constraint(s) previously identified at steps 406-413. Such a machine language search query could be embodied in the form of a SQL query or any other query language. Using an example natural language search query 106 of "show all balances for customers in California," the machine learning model 219 might identify the operator as "SELECT," the attributes as "acct_bal" in the "Customers" table, and the constraint as "state='CA.'" Accordingly, the query converter 213 could generate a machine language search query in SQL of "SELECT acct_bal FROM Customers WHERE state 'CA.'" Once the machine language search query has been generated, it may then be passed off to the data store engine 216 for validation and/or execution.

Figure 5:
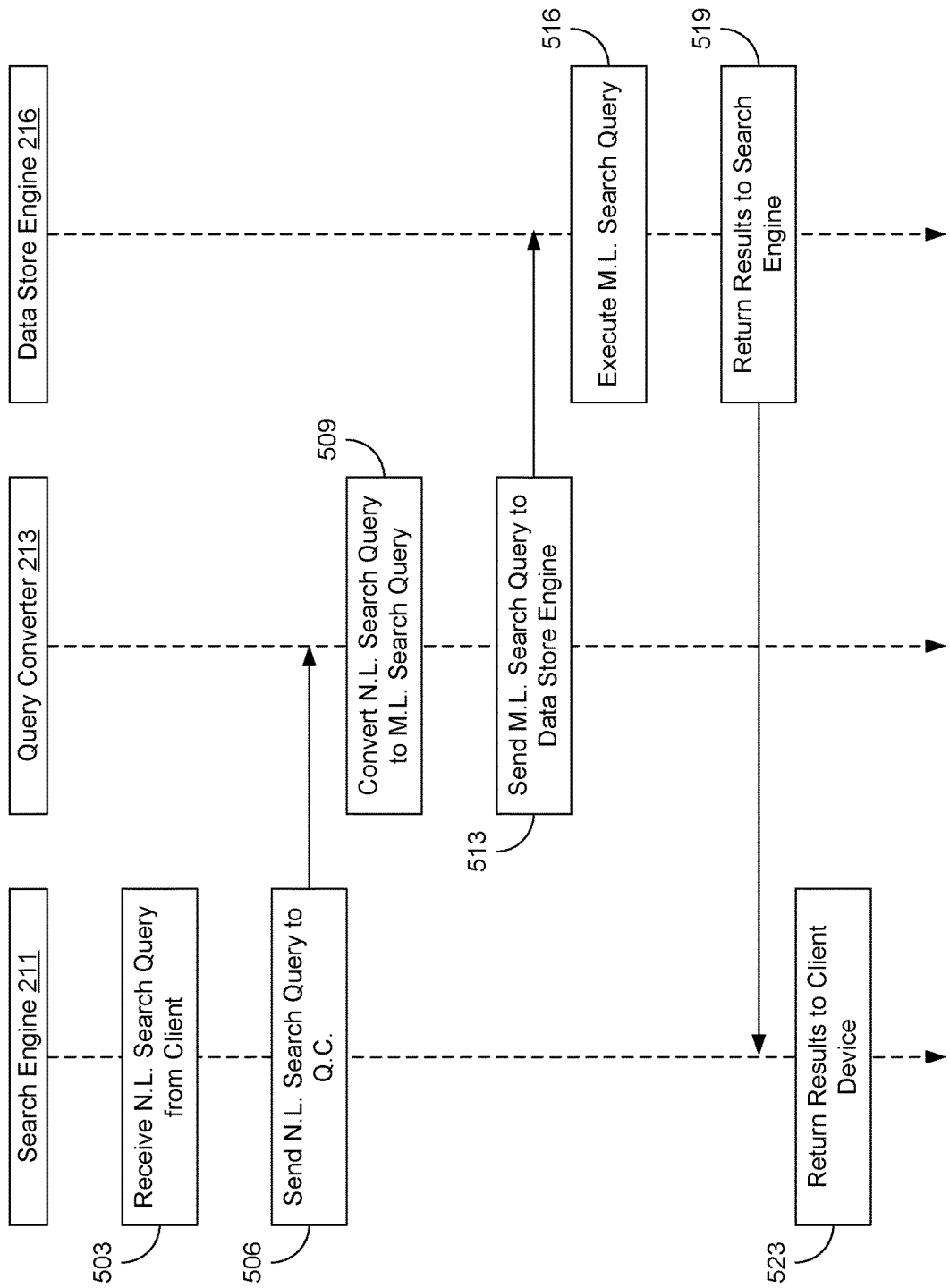
FIG. 5 is a sequence diagram illustrating one example of the interactions between several components of the network environment of FIG. 2 according to various embodiments of the present disclosure.

Referring next to FIG. 5, shown is a sequence diagram that provides one example of the interaction between the search engine 211, the query converter 213, and the data store engine 216 of the network environment 200. It is understood that the sequence diagram of FIG. 5 provides merely an example of the many different types of functional arrangements that can be employed to implement the operation of the depicted portions of the network environment 200. As an alternative, the sequence diagram of FIG. 2 can be viewed as depicting an example of elements of a method implemented within the network environment 200.

Beginning with step 503, the search engine 211 receives a natural language search query 106 from a client application 256 executing on a client device 206. For example, the search engine 211 could receive a natural language search query 106 submitted by a browser or audio data from a virtual assistant.

Then, at step 506, the search engine 211 can forward the natural language search query 106 to the query converter 213. For example, the search engine 211 could invoke a function provided by an application programming interface (API) provided by the query converter 213 and provide the natural language search query 106 as an argument to the function.

Next at step 509, the query converter 213 can analyze the natural language search query 106 and convert it into a machine language search query. For example, the query converter 213 may use a trained machine learning model 219 to perform machine translation to convert the natural language search query 106 into a machine language search query. The machine learning model 219 may have been previously trained using an approach such as that depicted in FIG. 3 and may perform the translation or conversion of the natural language search query 106 into the machine language search query using an approach such as that depicted in FIG. 4.

Proceeding to step 513, the query converter 213 can then send the machine language search query to the data store engine 216 for execution. For example, the search engine 211 could invoke a function provided by an application programming interface (API) provided by the data store engine 216 and provide the machine language search query as an argument to the function. In some implementations, the query converter 213 could also provide a callback function or identifier for the search engine 211 as an argument to the function to allow the data store engine 216 to provide search results to the search engine 211.

Then at step 516, the data store engine 216 can execute the machine language search query. For example, the data store engine 216 may select all records 226 or specified attributes of records 226 from a table identified in the machine language search query which satisfy a constraint identified in the machine language search query. The selected records 226 or attributes of records 226 could then be grouped together to generate the search results 109.

Next at step 519, the data store engine 216 can return the records 226 or other results that were identified at step 516. In some implementations, the search results can be provided to the search engine 211 directly using the callback function or identifier provided by the query converter 213 at step 513. In other implementations, however, the data store engine 216 could provide the search results 109 to the query converter 213, which could then relay the search results 109 to the search engine 211.

Finally at step 523, the search engine 211 can return the search results 109 to the client application 256 for presentation to the user.

A number of software components previously discussed are stored in the memory of the respective computing devices and are executable by the processor respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 203.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
train a machine learning model based at least in part on a parallel corpus of queries comprising natural language queries and machine language queries, the machine learning model being configured to identify at least one operator, at least one attribute, and at least one constraint from a plurality of tokens, and wherein the natural language queries are mapped to the machine language queries;
parse a natural language query to identify the plurality of tokens;
identify, with the machine learning model, the at least one operator based at least in part on the plurality of tokens;
identify, with the machine learning model, the at least one attribute and at least one respective attribute value based at least in part on the plurality of tokens;
identify, with the machine learning model, the at least one constraint based at least in part on the plurality of tokens; and
generate a machine language query based at least in part on the at least one operator, the at least one constraint, the at least one attribute, and the at least one respective attribute value.

2. The system of claim 1, wherein the machine-readable instructions that cause the computing device to at least train the machine learning model further cause the computing device to at least train the machine learning model based at least in part on a query template, a thesaurus, and a schema for a plurality of records.

3. The system of claim 2, wherein the machine-readable instructions that cause the computing device to at least train the machine learning model further cause the computing device to at least:
  insert a machine language operator into a machine language example query based at least in part on a machine language query template;
  select a first synonym for the machine language operator from the thesaurus;
  insert the first synonym into a natural language example query based at least in part on a natural language query template;
  insert a machine language constraint into the machine language example query based at least in part on the machine language query template;
  select a second synonym for the machine language constraint from the thesaurus;
  insert the second synonym into a natural language example query based at least in part on the natural language query template;
  insert a machine language attribute and an attribute value into the machine language example query based at least in part on the machine language query template;
  select a third synonym for the machine language attribute from the thesaurus;
  insert the third synonym and the attribute into the natural language example query based at least in part on the natural language query template; and
  store the machine language example query and the natural language example query together in the parallel corpus of queries.

4. The system of claim 1, wherein the machine-readable instructions that cause the computing device to identify the at least one operator further cause the computing device to at least determine that at least one of the plurality of tokens is indicative of the at least one operator.

5. The system of claim 1, wherein the machine-readable instructions that cause the computing device to identify the at least one constraint based at least in part on the plurality of tokens further cause the computing device to at least determine that at least one of the plurality of tokens is indicative of the at least one constraint.

6. The system of claim 1, wherein the machine-readable instructions that cause the computing device to identify the at least one attribute and at least one respective attribute value based at least in part on the plurality of tokens further cause the computing device to at least determine that a first one of the plurality of tokens is indicative of the at least one attribute and a second one of the plurality of tokens is indicative of the at least one respective attribute value.

7. The system of claim 1, wherein the machine-readable instructions further cause the computing device to at least execute the machine language query.

8. A method, comprising:
  training a machine learning model based at least in part on a parallel corpus of queries comprising natural language queries and machine language queries, the machine learning model being configured to identify at least one operator, at least one attribute, and at least one constraint from a plurality of tokens, and wherein the natural language queries are mapped to the machine language queries;
  parsing a natural language query to identify the plurality of tokens;
  identifying, with the machine learning model, the at least one operator based at least in part on the plurality of tokens;
  identifying, with the machine learning model, the at least one attribute and at least one respective attribute value based at least in part on the plurality of tokens;
  identifying, with the machine learning model, the at least one constraint based at least in part on the plurality of tokens; and
  generating a machine language query based at least in part on the at least one operator, the at least one constraint, the at least one attribute, and the at least one respective attribute value.

9. The method of claim 8, wherein training the machine learning model is further based at least in part on a query template, a thesaurus, and a schema for a plurality of records.

10. The method of claim 9, wherein training the machine learning model further comprises:
  insert a machine language operator into a machine language example query based at least in part on a machine language query template;
  select a first synonym for the machine language operator from the thesaurus;
  insert the first synonym into a natural language example query based at least in part on a natural language query template;
  insert a machine language constraint into the machine language example query based at least in part on the machine language query template;
  select a second synonym for the machine language constraint from the thesaurus;
  insert the second synonym into a natural language example query based at least in part on the natural language query template;
  insert a machine language attribute and an attribute value into the machine language example query based at least in part on the machine language query template;
  select a third synonym for the machine language attribute from the thesaurus;
  insert the third synonym and the attribute into the natural language example query based at least in part on the natural language query template; and
  store the machine language example query and the natural language example query together in the parallel corpus of queries.

11. The method of claim 8, wherein identifying the at least one operator further comprises determining that at least one of the plurality of tokens is indicative of the at least one operator.

12. The method of claim 8, wherein identifying the at least one constraint based at least in part on the plurality of tokens further comprises determining that at least one of the plurality of tokens is indicative of the at least one constraint.

13. The method of claim 8, wherein identifying the at least one attribute and at least one respective attribute value based at least in part on the plurality of tokens further comprises determining that a first one of the plurality of tokens is indicative of the at least one attribute and a second one of the plurality of tokens is indicative of the at least one respective attribute value.

14. The method of claim 8, further comprising executing the machine language query.

15. A non-transitory, computer-readable medium, comprising machine-readable instructions that, when executed by a processor of a computing device, cause the computing device to at least:
  train a machine learning model based at least in part on a parallel corpus of queries comprising natural language queries and machine language queries, the machine learning model being configured to identify at least one operator, at least one attribute, and at least one constraint from a plurality of tokens, and wherein the natural language queries are mapped to the machine language queries;

parse a natural language query to identify the plurality of tokens;

identify, with the machine learning model, the at least one operator based at least in part on the plurality of tokens;

identify, with the machine learning model, the at least one attribute and at least one respective attribute value based at least in part on the plurality of tokens;

identify, with the machine learning model, the at least one constraint based at least in part on the plurality of tokens; and generate a machine language query based at least in part on the at least one operator, the at least one constraint, the at least one attribute, and the at least one respective attribute value.

16. The non-transitory, computer-readable medium of claim 15, wherein the machine-readable instructions that cause the computing device to at least train the machine learning model further cause the computing device to at least train the machine learning model based at least in part on a query template, a thesaurus, and a schema for a plurality of records.

17. The non-transitory, computer-readable medium of claim 16, wherein the machine-readable instructions that cause the computing device to at least train the machine learning model further cause the computing device to at least:

insert a machine language operator into a machine language example query based at least in part on a machine language query template;

select a first synonym for the machine language operator from the thesaurus;

insert the first synonym into a natural language example query based at least in part on a natural language query template;

insert a machine language constraint into the machine language example query based at least in part on the machine language query template;

select a second synonym for the machine language constraint from the thesaurus;

insert the second synonym into a natural language example query based at least in part on the natural language query template;

insert a machine language attribute and an attribute value into the machine language example query based at least in part on the machine language query template;

select a third synonym for the machine language attribute from the thesaurus;

insert the third synonym and the attribute into the natural language example query based at least in part on the natural language query template; and store the machine language example query and the natural language example query together in the parallel corpus of queries.

18. The non-transitory, computer-readable medium of claim 15, wherein the machine-readable instructions that cause the computing device to identify the at least one operator further cause the computing device to at least determine that at least one of the plurality of tokens is indicative of the at least one operator.

19. The non-transitory, computer-readable medium of claim 15, wherein the machine-readable instructions that cause the computing device to identify the at least one constraint based at least in part on the plurality of tokens further cause the computing device to at least determine that at least one of the plurality of tokens is indicative of the at least one constraint.

20. The non-transitory, computer-readable medium of claim 15, wherein the machine-readable instructions that cause the computing device to identify the at least one attribute and at least one respective attribute value based at least in part on the plurality of tokens further cause the computing device to at least determine that a first one of the plurality of tokens is indicative of the at least one attribute and a second one of the plurality of tokens is indicative of the at least one respective attribute value.

* * * * *